(12) United States Patent
Futase

(10) Patent No.: US 8,453,697 B2
(45) Date of Patent: Jun. 4, 2013

(54) DEVICE FOR ATTACHING ONE-WAY POURING NOZZLE

(75) Inventor: Katsunori Futase, Niigata (JP)

(73) Assignee: Yushin Co., Ltd., Niigata (JP)

( * ) Notice: Subject to any disclaimer, the term of this patent is extended or adjusted under 35 U.S.C. 154(b) by 49 days.

(21) Appl. No.: 13/379,507

(22) PCT Filed: Jun. 8, 2010

(86) PCT No.: PCT/JP2010/060001
§ 371 (c)(1),
(2), (4) Date: Dec. 20, 2011

(87) PCT Pub. No.: WO2010/150672
PCT Pub. Date: Dec. 29, 2010

(65) Prior Publication Data
US 2012/0152462 A1   Jun. 21, 2012

(30) Foreign Application Priority Data
Jun. 22, 2009   (JP) .................................. 2009-147440

(51) Int. Cl.
*B32B 37/06* (2006.01)
(52) U.S. Cl.
USPC ........... 156/494; 156/541; 156/553; 156/555; 156/582; 156/583.1
(58) Field of Classification Search
USPC ................. 156/494, 538, 539, 540, 541, 542, 156/553, 554, 555, 580, 582, 583.1
See application file for complete search history.

(56) References Cited

U.S. PATENT DOCUMENTS

| 5,207,855 A * | 5/1993 | Nyfeler et al. ................ 156/351 |
| 7,908,829 B2 * | 3/2011 | Ligon et al. ..................... 53/511 |
| 2010/0119783 A1 * | 5/2010 | Futase ........................... 428/192 |

FOREIGN PATENT DOCUMENTS

| JP | 41-17816 | 10/1966 |
| JP | 45-24611 | 8/1970 |
| JP | 61-15128 | 1/1986 |
| JP | 2005-59958 | 3/2005 |
| JP | 2008-55739 | 3/2008 |

OTHER PUBLICATIONS

WIPO International Preliminary Examination Report, English language translation, Jan. 26, 2012.

* cited by examiner

Primary Examiner — James Sells
(74) Attorney, Agent, or Firm — Greenblum & Bernstein P.L.C.

(57) ABSTRACT

There is provided a device for attaching a one-way type pouring nozzle, which includes a simple and small-size mechanism capable of efficiently fusion-joining the one-way type pouring nozzle to a film for package bag. In this device, a nozzle template film formed with a plurality of one-way type pouring nozzles templated by tear-inducing flaws is fed to a continuously running film for package bag to fusion-join a base portion of each of the one-way type pouring nozzles through its outer sealant layer to an inner sealant layer on one-sided portion of the film for package bag, while an unwanted portion of the nozzle template film is cut out and removed. The device also includes a pair of fusion rollers pushing and fusion-joining the one-way type pouring nozzle in the nozzle template film to the running film for package bag under the running at equal speed, and the fusion roller pair is constituted with a heating roller always energizing toward the side of the running path of the film for package bag, and a heat roller for attachment provided with protrusions intermittently pushing the film for package bag to positions of one-way type pouring nozzles in the nozzle template film on the heating roller.

7 Claims, 3 Drawing Sheets

DEVICE FOR ATTACHING ONE-WAY POURING NOZZLE

TECHNICAL FIELD

This invention relates to a device used in the manufacture of a package bag provided with a pouring nozzle having a one-way function for filling and packing a liquid material to be packed such as seasoning, wine, sake, soup, dressing or the like, and more particularly to a device for attaching a one-way pouring nozzle to a laminate film for package bag comprised of soft films having a flexibility.

RELATED ART

A film-shaped liquid pouring nozzle developing a self-sealing one-way function and a package bag using the same are disclosed, for example, in JP-A-2005-59958. The liquid pouring nozzle is applied to such a soft main body of a package bag having a flexibility that the liquid material filled in the package bag is poured without introducing ambient air into the package bag instead of the pouring material (i.e. one-way function) and also shrinking or collapsing deformation is caused depending upon the pouring quantity of the liquid material. The liquid pouring nozzle itself acts to automatically seal its pouring port through wetting of the liquid material at the same time of stopping the pouring of the liquid material (i.e. self-sealing action) to thereby surely prevent invasion of ambient air into the main body of the package bag.

The liquid pouring nozzle is integrally united with the package bag main body or fusion-joined to the package bag main body afterwards. In the latter case, a base end portion of the nozzle is fusion joined to an inner face of a side portion or a top portion of the soft main body of the package bag through an outermost sealant layer of the nozzle.

The liquid pouring nozzle is formed by a method wherein a laminate film of three layers comprising a thermoplastic uniaxially- or biaxially-oriented base film layer and inner and outer sealant layers sandwiching the base film layer and laminated thereto is used in form of a pair of front and rear two laminate films or a single laminate film folded at its central portion and peripheral portions other than base end portions are fused to each other at a posture of facing the inner sealant layers to each other.

In JP-A-2008-55739 is disclosed a basic attitude on a device for attaching a pouring nozzle wherein the film-shaped liquid pouring nozzle having a one-way function is attached simply and efficiently to a proper place of a soft packing film for the package bag main body frequently having a lamination structure (frequently a side edge portion of the film) while continuously running the film for packing.

Such a device for attaching the pouring nozzle comprises a feed shaft supporting a wound roll of a nozzle film previously formed with many pouring nozzles, a feed roll continuously drawing the nozzle film from the wound roll on the feed shaft at a given rate, a thermal roll arranged, for example, in a continuous running path of a packing film in a filling and packing machine and always contacting with a side of a base film layer in the packing film of lamination structure, a pressure roll displaced back and forth to the thermal roll to push the outer sealant layer of the nozzle film to the inner sealant layer of the packing film on the thermal roll to thereby join the pouring nozzle to the packing film through heat sealing, a separation roll cutting out an unwanted portion of the nozzle film from the pouring nozzle after the joining of the pouring nozzle to the packing film, and a take-up shaft for the unwanted portion of the nozzle film.

SUMMARY OF THE INVENTION

Problems to be Solved by the Invention

This invention is concerned with an improvement in the attachment device of the pouring nozzle described in JP-A-2008-55739. It is an object of the invention to provide a device for attaching a one-way type pouring nozzle which is a simple and small mechanism irrespectively of continuously or intermittently feed-running the nozzle film and can largely improve the fusion joining efficiency of the one-way type pouring nozzle to the packing film under a simple operation control.

Means for Solving Problems

The device for attaching the one-way type pouring nozzle according to the invention comprises a mechanism wherein a plurality of one-way type pouring nozzles templated so as to easily cut out with tear-inducing flaws intermittently or continuously and synchronously feed-run a nozzle template film of a soft lamination structure previously formed in a line at given pitches with respect to a continuously running film for package bag with a lamination structure; a mechanism wherein a base portion of each of the one-way type pouring nozzles is fusion-joined through its outer sealant layer to a sealant layer of a side portion of the film for package bag (portion corresponding to the inside of the bag); and a mechanism wherein an unwanted portion of the nozzle template film after the templating of the nozzle portion is removed by cutting out from each of the one-way type pouring nozzles along a tear-inducing flaw.

This attachment device comprises a feed shaft supporting a wound roll of the nozzle template film, and a pair of fusion rollers arranged opposing to each other through a film for package bag to fusion-join a one-way type pouring nozzle of the nozzle template film feeding from the feed shaft and running at an equal speed to the continuously running film for package bag under pressing. The pair of the fusion rollers are constituted with a heater-contained heating roller always energizing the wound nozzle template film toward the running path of the film for package bag, and a heater-contained heat roller for attachment with protrusions intermittently pressing the film for package bag to the nozzle template film on the heating roller at positions of one-way type pouring nozzles.

In the above attachment device, the heating roller is preferable to be provided with an elastic nip roller nipping the nozzle template film. By nipping the nozzle template film between the heating roller and the nip roller is prevented slippage of the nozzle template film to the heating roller, and hence the nozzle template film can be surely run at a speed equal to the driving circumferential speed of the heating roller.

Also, the attachment device is preferable to be provided with a take-up shaft taking an unwanted portion of the nozzle template film cut out from the one-way type pouring nozzle and rotary-driving at a given speed. The adoption of the take-up shaft has an advantage that the unwanted portion of the nozzle template film can be wound on the take-up shaft smoothly but also the running of the nozzle template film can be assisted in relation with the feed running speed thereof.

Furthermore, it is preferable that a plurality of nozzle film guide rollers are arranged between the feed shaft and the pair of fusion rollers and between the take-up shaft and the pair of fusion rollers, respectively. By adopting the nozzle film guide rollers can be properly run the nozzle template film as is expected without meandering or wrinkling before and after the pair of fusion rollers.

Among the plural nozzle film guide rollers located at distances from the pair of fusion rollers, at least each one of the guide rollers located before and after the pair of fusion rollers is preferable to be a dancer roller adjusting tension of the nozzle template film. In case of adopting the dancer roller, when the circumferential speed of the pair of fusion rollers, i.e. the running speed of the nozzle template film is equal to the speed of the continuously running film for package bag irrespectively of the intermittently or continuously feeding of the nozzle template film or when the speed of the take-up shaft is the running speed of the nozzle template film, the fast or slow of the speed of the nozzle template film can be effectively absorbed by displacement of the dancer roller.

When a film feed roller rotary-driven under pinching of the nozzle template film is disposed at least one of the feed shaft side and the take-up shaft side relative to the pair of fusion rollers, the feed running speed of the nozzle template film more adequately.

In the device as mentioned above, the heat roller for attachment constituting the pair of fusion rollers may be rollers rotary-driven intermittently or continuously, if necessary.

Effect of the Invention

In the device for attaching the one-way type pouring nozzle according to the invention, the pair of fusion rollers, which fusion join the one-way type pouring nozzle previously formed in the nozzle template film to the side portion of the film for package bag under pressing with rotary driving, are constituted with the heating roller always energizing the nozzle template film toward the running path of the film for package bag, for example, through a cylinder and the heat roller for attachment with protrusions intermittently pressing the film for package bag to the nozzle template film on the heating roller at positions of one-way type pouring nozzles under rotary driving.

In the invention, therefore, there is no need for disposing an elongated heat roller in always contact with the film for package bag, which has been adopted in the conventional attachment device. Furthermore, the invention can attain the miniaturization of the device and the simplification of the structure because there is no need for dividing the elongated heat roller into a thermal insulating structural portion and a non-thermal insulating structural portion and running the nozzle template film in correspondence to the non-thermal insulating structural portion.

According to the invention, it is made unnecessary to use the pressure roll displacing the nozzle template film back and forth to the film for package bag continuously running at a constant speed in synchronized timing to fusion-join the one-way type pouring nozzle templated from the nozzle template film to the film for package bag at a predetermined position. Therefore, the operation control of the device is made simple, and hence the structure of the device can be more simplified.

According to the invention, each of the one-way type pouring nozzles can be surely fusion-joined to the film for package bag at the predetermined position by controlling the rotating speed of the rotary-driven fusion rollers, so that the fusion joining efficiency of the pouring nozzle can be improved largely.

In such a nozzle attaching device, it is preferable that an elastic nip roller is disposed to nip the nozzle template film between the elastic nip roller and the heating roller constituting the pair of fusion rollers. In this case, the slippage of the nozzle template film to the heating roller can be effectively prevented to make the running speed of the nozzle template film and the driving circumferential speed of the heating roller equal surely.

According to the invention, the take-up shaft rotary-driving at a given speed is disposed for winding the unwanted portion of the nozzle template film cut out from the one-way type pouring nozzle, whereby the unwanted portion of the nozzle template film can be smoothly wound on the take-up shaft under an action of an expected tension irrespectively of intermittently or continuously rotating the pair of fusion rollers. Furthermore, when the take-up shaft is rotary-driven at a speed equal to the circumferential speed of the heating roller or the like, it can also assist the feed running of the nozzle template film.

In this case, a plurality of nozzle film guide rollers are preferable to be arranged between each of the feed shaft and the take-up shaft and the pair of fusion rollers, respectively. Thus, the meandering of the nozzle template film can be prevented effectively before and after the pair of fusion rollers but also the wrinkling of the nozzle template film can be prevented.

Furthermore, among the plural nozzle film guide rollers located at distances from the pair of fusion rollers, at least each one nozzle film guide roller before and after to the fusion roller is preferable to be a dancer roller adjusting tension of the nozzle template film. In this case, when the feeding speed of the nozzle template film based on the driving circumferential speed of the pair of the fusion rollers is made equal to the running speed of the film for package bag continuously running at a constant speed irrespectively of the intermittently or continuously feeding of the nozzle template film, fast or slow part in the running speed of the nozzle template film can be absorbed by the displacement of the dancer roller sufficiently smoothly and rapidly.

When a film feed roller, for example, rotary-driven at a speed equal to the circumferential speed of the fusion roller is disposed on at least one of the feed shaft and the take-up shaft under the sandwiching of the nozzle template film with respect to the pair of the fusion rollers, the feed running speed of the nozzle template film can be corresponded to the circumferential speed of the heating roller more adequately.

Moreover, when the feed running speed of the nozzle template film can be surely made equal to the continuously running speed of the film for package bag while corresponding to the circumferential speed of the pair of the fusion rollers with high precision at a required time point, the rotation of the heat roller for attachment constituting the pair of the fusion rollers may be intermittent or continuous.

EMBODIMENTS FOR CARRYING OUT THE INVENTION

Figure 1:
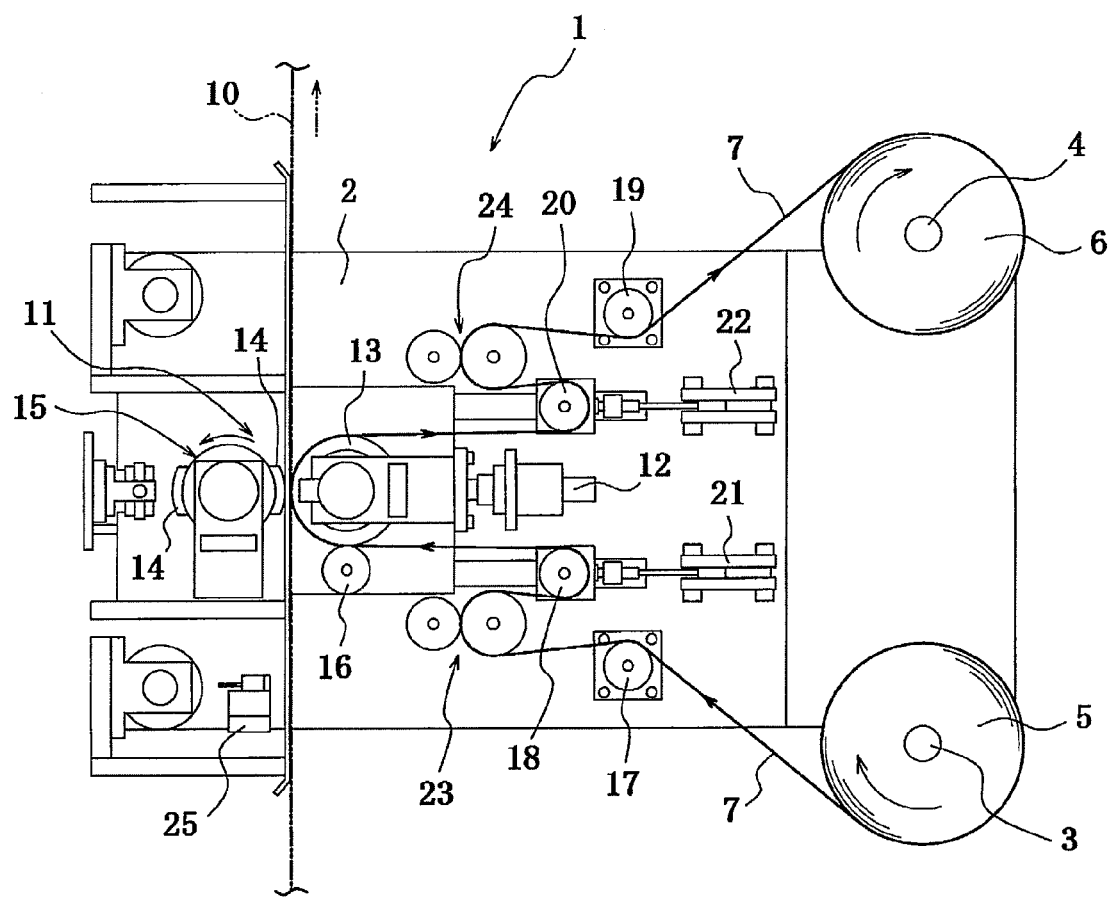
FIG. 1 is a schematically front view illustrating an embodiment of the invention.

FIG. 1 is a schematically front view illustrating an embodiment of the invention, wherein a device 1 for attaching a one-way type pouring nozzle can be attached to an existing automatic filling and packing machine located on a base plate 2 and at a left end part of the figure.

Numeral 3 in the figure represents a feed shaft supporting a wound roll of a nozzle template film with a soft laminate structure under a braking action and accepting feed running of the nozzle template film from the wound roll.

Numeral 4 in the figure represents a take-up shaft taking up an unwanted portion of the nozzle template film at a state of cutting out a one-way type pouring nozzle after a base portion of each of one-way type pouring nozzles rotary-driven by a driving motor and formed in the nozzle template film in an aligned posture is fusion-joined to a given place of a film for package bag continuously run and having usually a lamination structure.

In the figure, numeral 5 represents a wound roll of the nozzle template film previously provided with a plurality of one-way type pouring nozzles in an aligned posture, and numeral 6 represents an unwanted portion wound roll of the nozzle template film after each of the one-way type pouring nozzles is fusion-joined to one-sided face of the film for package bag at a given place.

Figure 2:
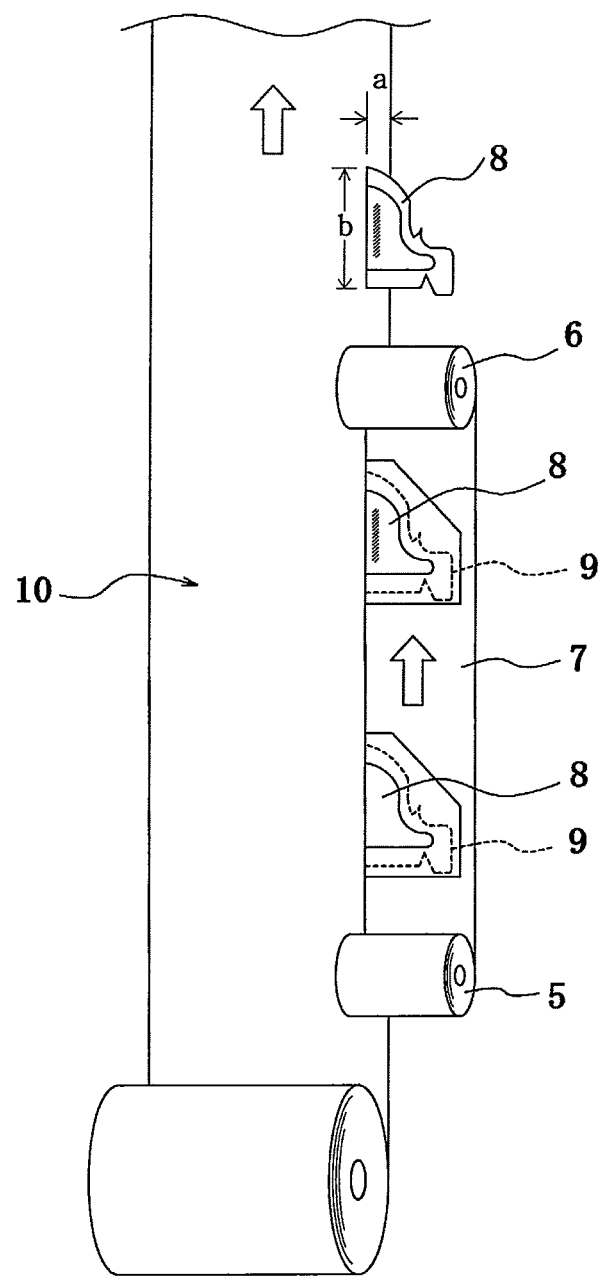
FIG. 2 is a schematic view illustrating a fusion joining system of a one-way type pouring nozzle to a film for package bag.

As schematically shown in FIG. 2, the nozzle template film 7 with a soft laminate structure feed-run from the wound roll 5 on the feed shaft 3 is provided with a plurality of one-way type pouring nozzles 8 previously formed in an aligned posture and a tear-inducing flaw 9 enclosing each of the one-way type pouring nozzles 8 and formed, for example, in a perforated line.

Each of the one-way type pouring nozzles 8 templated at equal intervals and enclosed with the tear-inducing flaw 9 in the nozzle template film 7 is joined as shown by diagonal lines in the figure through fusion, for example, by heat sealing between a sealant layer in one side portion of a film 10 for package bag with a lamination structure continuously running at a constant speed and a sealant layer on an outer surface of the base portion of the nozzle 8.

Also, the remaining unwanted portion (film body) of the nozzle template film 7 is cut out from the each of the one-way type pouring nozzles along the tear-inducing flaw 9 and taken up on the take-up shaft 4 based on the rotary-driving of the take-up shaft 4 or the like to form the unwanted portion wound roll 6.

In this case, the take-up shaft 4 is rotary-driven at a circumferential speed approximately equal to the feed running speed of the nozzle template film 7.

In the device shown in FIG. 1, a pair of fusion rollers 11 each containing a heater are arranged so as to oppose to each other through the film 10 for package bag continuously run at a constant speed. The fusion rollers 11 push only the base end portion of the one-way type pouring nozzle 8 in the nozzle template film 7 running at an equal speed with the film for package bag fed from the feed shaft 3 is pushed to the running film 10 for package bag and fusion joined thereto, for example, at a width (a) of 3-50 mm and a length (b) of 20-150 mm. Moreover, the joining interval in the film 10 for package bag is about 50-mm-500 mm in accordance with the size of the package bag.

Here, the pair of fusion rollers 11 are constituted with a heater-contained heating roller 13 always energizing the wound nozzle template film 7 toward the side of the running path of the film 10 for package bag, for example, by a cylinder 12, and a heater-contained heat roller for attachment 15 provided with protrusions 14 intermittently pushing the film 10 for package bag to a position of the one-way type pouring nozzle 8 in the nozzle template film 7 on the heating roller 13.

Moreover, the one-way type pouring nozzle 8 templated from the nozzle template film 7 and the film 10 for package bag are fusion-joined to each other through mutually opposing sealant layers thereof by heat quantities supplied from the heating roller 13 and the heat roller for attachment 15 and the pushing force of the protrusion 14.

Therefore, the protrusion 14 of the heat roller for attachment 15 is located apart from the film 10 for package bag in zones of the film 10 for package bag other than joining places to the one-way type pouring nozzles 8.

In the device shown in FIG. 1, the heating roller 13 constituting the fusion roller 11 is provided with a nip roller 16 elastically nipping the nozzle template film 7 to prevent slippage of the nozzle template film 7 to the heating roller 13.

Also, a plurality of nozzle film guide rollers 17, 18 and 19, 20 are disposed between each of the feed shaft 3 and the take-up shaft 4 and the pair of fusion rollers 11 in the device of FIG. 1, respectively, to prevent meandering of the running nozzle template film 7, occurrence of wrinkles therein, and so on.

Among these nozzle film guide rollers 17, 18 and 19, 20, the guide roller 18, 20 is preferable to be a dancer roller connected to cylinders 21, 22, spring means and so on to adjust tension of the nozzle template film 7 in view of enhancing the follow-up running property of the nozzle template film 7 to the heating roller 13.

More preferably, film feed rollers 23, 24 rotary-driving the nozzle template film 7 are disposed in at least one of feed shaft side and take-up shaft side of the pair of the fusion rollers 11, in both sides thereof in the figure, whereby the follow-up running property of the feeding nozzle template film 7 to the heating roller 13 is more enhanced.

Next, the method for fusion-joining the one-way type pouring nozzles 8 formed in the nozzle template film 7 to the continuously running film 10 for package bag will be described with reference to the above device. At first, the nozzle template film 7 is wound around a variety of rollers as shown by a solid line in the figure. At this state, the nozzle template film 7 is feed-run from the wound roll 5 continuously or intermittently. When a film mark sensor 25 detects arrival of the film 10 for package bag at a given position of joining the pouring nozzle, the circumferential speed of the fusion rollers 11 is gradually increased to the running speed of the film 10 for package bag. Further, when the place of the film 10 for package bag for joining the nozzle reaches to the fusion rollers 11, the film 10 for package bag is pushed and heated through the protrusion 14 of the heat roller for attachment 15 to the one-way type pouring nozzle 8 of the nozzle template film 7 running at an equal speed with the film 10 for package bag. In this way, the sealant layer in the one-sided portion of the film 10 for package bag is fused to the one-sided outer surface of the one-way type pouring nozzle 8 as shown by diagonal lines in FIG. 2.

Thus, the one-way type pouring nozzle 8 is fusion-joined to the film 10 for package bag, while the nozzle template film 7 is cut out from the one-way type pouring nozzles 8 along the tear-inducing flaw 9 by separating apart from the running path of the film 10 for package bag. The unwanted portion of the nozzle template film 7 is wound on the take-up shaft 4 to form the unwanted portion wound roll 6.

On the other hand, the one-way type pouring nozzle 8 joined to the film 10 for package bag is run together with the film 10 for package bag in the automatic filling and packing machine.

As previously mentioned, all of the nip roller 16, dancer rollers 18, 20 and rotary-driven film feed rollers 23, 24 act to enhance the follow-up running property of the nozzle template film 7 to the fusion rollers 11.

In the embodiment of FIG. 1, each of the film feed rollers 23, 24 is comprised of a roller pair for nipping the nozzle template film 7, but the each film feed roller may be comprised of a single rotary-driving rubber roller or the like capable of generating a large friction force to the nozzle template film 7.

Figure 3:
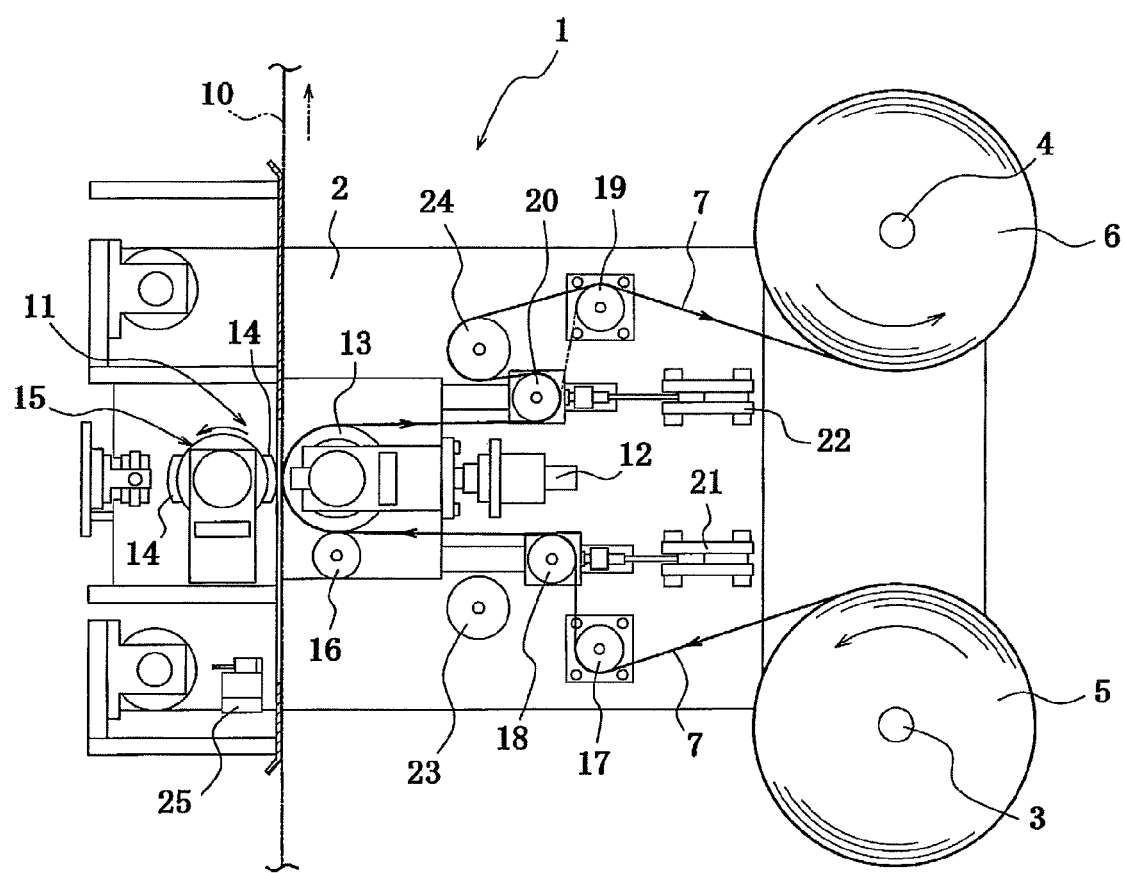
FIG. 3 is a schematically front view illustrating another embodiment of the invention.

In FIG. 3, each of the film feed rollers 23, 24 is comprised of a rotary-driving rubber roller, while the feed and take-up rotating directions of the nozzle template film 7 are opposite to those shown in FIG. 1 and the film 7 is extended on the feed-side film feed roller 23 without winding.

When the running speed of the nozzle template film 7 corresponds to the rotating circumferential speed of the heating roller 13 in a high accuracy, even if the nozzle template film 7 is wound around the film feed roller 24 as shown in FIG. 3 or alternately if the winding is omitted as shown by a phantom line in FIG. 3, the nozzle template film 7 is run on the film 10 for package bag as is expected, whereby the one-way type pouring nozzle 8 can be properly fusion-joined to the film 10 for package bag as shown in FIG. 2.

The invention claimed is:

1. A device for attaching a one-way type pouring nozzle wherein a nozzle template film previously formed with a plurality of one-way type pouring nozzles templated in an aligned posture by tear-inducing flaws is feed-run to a continuously running film for package bag to fusion-join a base portion of each of the one-way type pouring nozzles through its outer surface sealant layer to a sealant layer in one-sided portion of the film for package bag, while an unwanted portion of the nozzle template film after templating of nozzle portion is cut out and removed from each of the one-way type pouring nozzles along the tear-inducing flaw, characterized in that the device comprises a feed shaft supporting a wound roll of the nozzle template film, and a pair of fusion rollers arranged opposing to each other through a film for package bag to fusion-join a one-way type pouring nozzle of the nozzle template film feeding from the feed shaft and running at an equal speed to the continuously running film for package bag under pressing, and said pair of the fusion rollers are constituted with a heater-contained heating roller always energizing the wound nozzle template film toward the running path of the film for package bag, and a heater-contained heat roller for attachment with protrusions intermittently pressing the film for package bag to the nozzle template film on the heating roller at positions of one-way type pouring nozzles.

2. A device for attaching a one-way type pouring nozzle according to claim 1, wherein the heating roller is provided with a nip roller for nipping the nozzle template film.

3. A device for attaching a one-way type pouring nozzle according to claim 1, which comprises a take-up shaft taking up an unwanted portion of the nozzle template film cut out from the one-way type pouring nozzle.

4. A device for attaching a one-way type pouring nozzle according to claim 3, wherein a plurality of nozzle film guide rollers are disposed between each of the feed shaft and the take-up shaft and the pair of fusion rollers, respectively.

5. A device for attaching a one-way type pouring nozzle according to claim 4, wherein among the plural nozzle film guide rollers located through the pair of fusion rollers, at least one guide roller located before and after the pair of fusion rollers is a dancer roller adjusting tension of the nozzle template film.

6. A device for attaching a one-way type pouring nozzle according to claim 3, wherein a film feed roller nipping the nozzle template film is disposed in at least one of feed shaft side and take-up shaft side of the pair of fusion rollers.

7. A device for attaching a one-way type pouring nozzle according to claim 1, wherein and the heat roller for attachment constituting the pair of fusion rollers is a roller rotary-driven intermittently or continuously.

* * * * *